Figure 1:
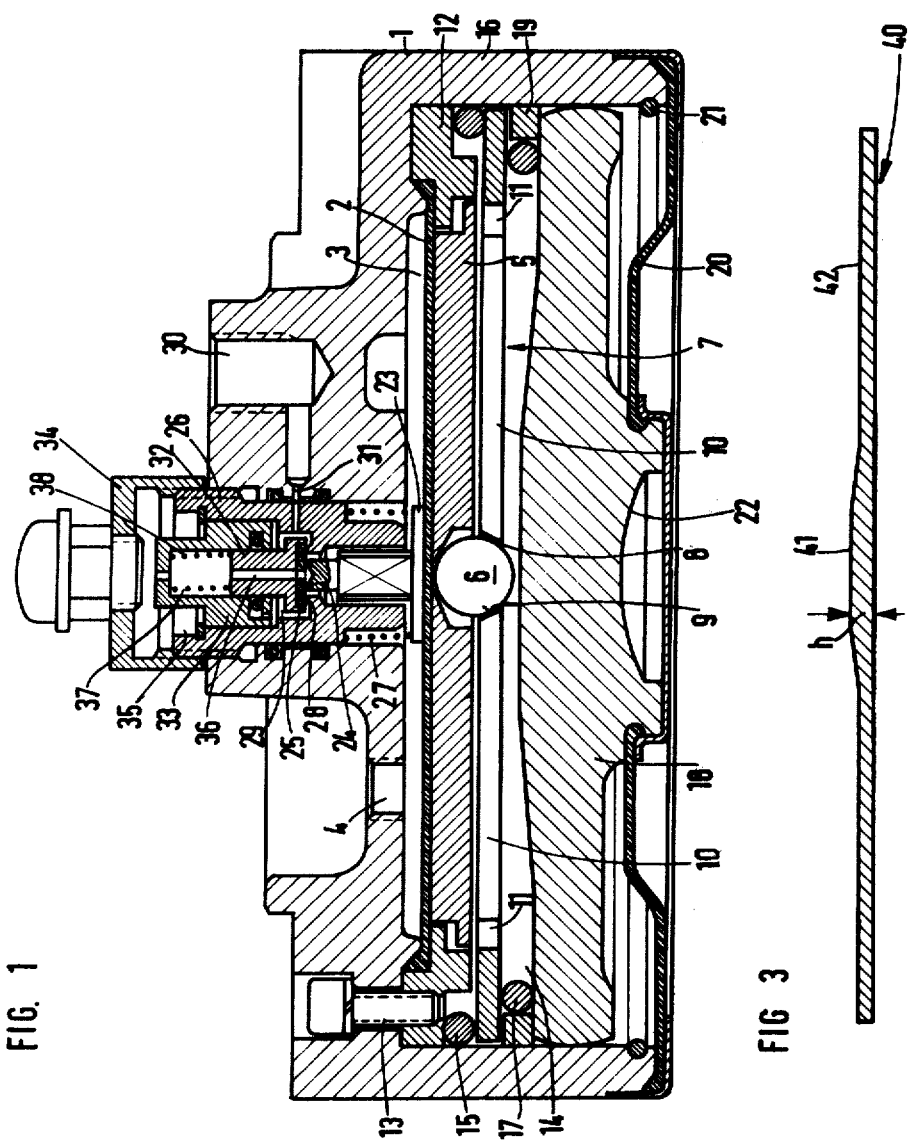

United States Patent

Pöllinger et al.

[11] 3,874,746
[45] Apr. 1, 1975

[54] BALANCING VALVE FOR A LOAD-RESPONSIVE BRAKE PRESSURE REGULATOR FOR VEHICLES

[75] Inventors: Hans Pöllinger; Bernd Wosegien, both of Munich; Eckart Saumweber, Gauting; Thomas Störzinger, Unterfohring, all of Germany

[73] Assignee: Knorr-Bremse GmbH, Munich, Germany

[22] Filed: Sept. 20, 1973

[21] Appl. No.: 399,198

[30] Foreign Application Priority Data
Sept. 27, 1972 Germany............................ 2247294

[52] U.S. Cl. .............................. 303/22 R, 188/195
[51] Int. Cl. .................................................. B60t 8/18
[58] Field of Search.......... 303/22 R, 22 A; 188/195

[56] References Cited
UNITED STATES PATENTS

| | | | |
|---|---|---|---|
| 3,228,731 | 1/1966 | Valentine | 303/22 R |
| 3,408,118 | 10/1968 | Asano et al. | 303/22 R |
| 3,503,656 | 3/1970 | Shattock et al. | 303/22 R |
| 3,606,485 | 9/1971 | Scott | 303/22 R |

Primary Examiner—Trygve M. Blix
Assistant Examiner—D. C. Butler
Attorney, Agent, or Firm—Edmund M. Jaskiewicz

[57] ABSTRACT

A balancing valve comprises a housing in which is mounted a presure regulator valve for establishing a control pressure proportional to the load of the vehicle. A spring plate is supported on its edge within the housing and is subjected to a proportion of the vehicle load on an intermediate annular portion thereof. A flexible diaphragm is responsive to the force of the control pressure and acts against the central portion of the spring plate in opposition to the vehicle load. The spring plate is provided with a central opening having a plurality of slots radiating therefrom to reduce the spring rigidity of the plate. As a modification, the spring plate may be provided with a reduced thickness portion defining an annular area concentric to the center of the plate. A thrust element is supported in the center of the spring plate to be acted upon by the diaphragm.

8 Claims, 3 Drawing Figures

FIG. 1

BALANCING VALVE FOR A LOAD-RESPONSIVE BRAKE PRESSURE REGULATOR FOR VEHICLES

The present invention relates to a balancing valve for a load-responsive brake pressure regulator for vehicle brakes using a pressure medium, more particularly, to the structure of a spring plate which is responsive to a proportion of the load of the vehicle.

Balancing valves have been provided employing a load reduction or step-down mechanism in the form of a lever system pivotally connected at one end thereof to the vehicle suspension which may be supported against an axle bearing of a vehicle wheel, pivoted in its central portion on the frame of the vehicle, and at its other end pivotally connected to a piston which generally comprises a flexible diaphragm. Such a balancing valve has the substantial advantage that the force absorbing and transmission mechanism can be contructed with relatively great strength, small size and simple in construction and as a result the balancing valves can be manufactured and assembled simply and quickly. However, such balancing valves have the disadvantage that any deviations in the axial orientation of the spring plate can readily result in a considerable variation in the required restoring force and accordingly in the control pressure which is introduced by the pressure regulator valve. Such deviations may be caused through tolerances introduced during the assembly of the valve or to wear of the bearings or other components during operation of the balancing valve.

It is therefore the principal object of the present invention to provide a balancing valve of the general type described above in which the spring plate is less sensitive to axial orientation but which incorporates a simple structure.

According to one aspect of the present invention a balancing valve for a load-responsive brake pressure regulator for vehicle brakes using a pressure medium may comprise a housing in which is mounted a pressure regulator valve for a establishing a control pressure proportional to the load of the vehicle. A spring plate is supported within the housing and acts upon the valve means. Moveable means are provided within the housing responsive to the load of the vehicle and acting against the spring plate in such a manner that the spring plate is responsive to a proportion of the vehicle load. There is further provided within the housing a flexible diaphragm which is responsive to the force of the control pressure of the valve means. The diaphragm acts against the spring plate in opposition to the vehicle load. In order that the spring plate is less sensitive to axial orientation the spring plate is provided with openings or reduced material portions which decrease the spring rigidity of the plate. As a result, the spring plate is softer and the change in spring force corresponding to the travel of the spring plate is smaller so that any deviations of orientation of the spring plate will exert only an insignificant effect on the restoring force and thus upon the control pressure. The openings may be in the form of recesses or perforations which may comprise a central opening having a plurality of slots radiating therefrom.

Figure 2:
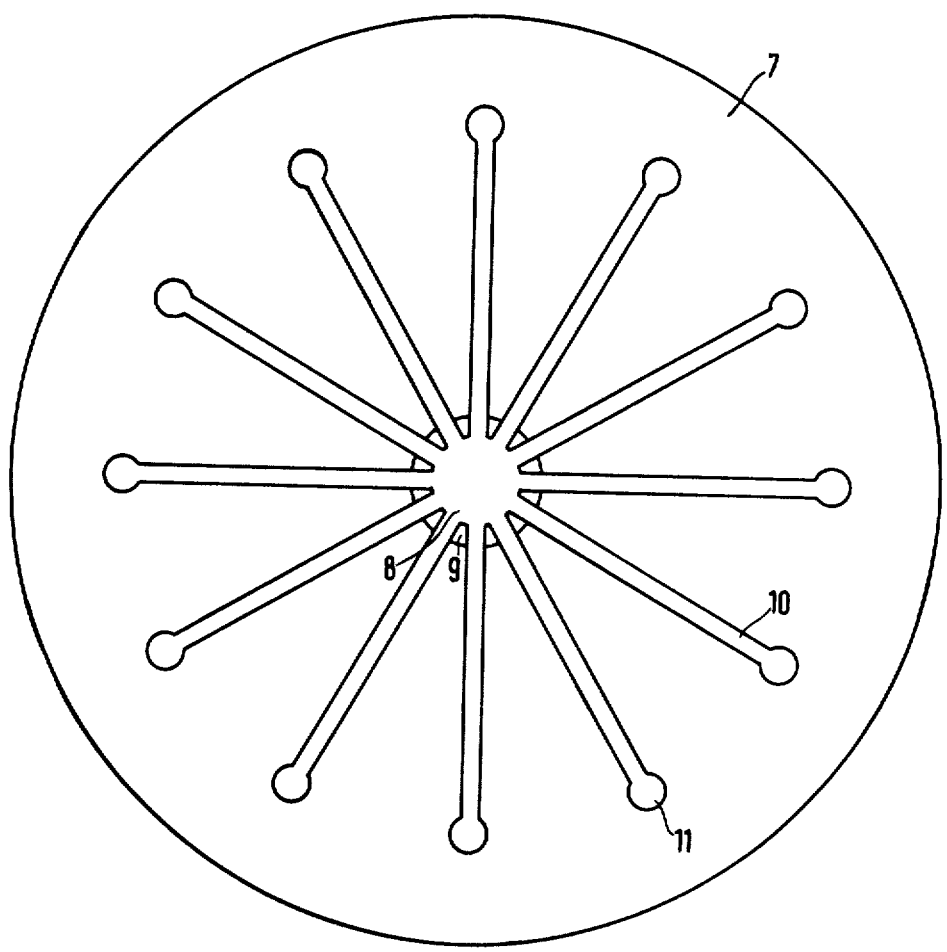

Other objects and advantages of the present invention will be apparent upon reference to the accompanying description when taken in conjunction with the following drawings, which are exemplary, wherein;

FIG. 1 is a longitudinal sectional view of a balancing valve incorporating the spring plate of the present invention; and FIG. 2 is a plan view of the spring plate employed in the balancing valve of FIG. 1; and FIG. 3 is a sectional view of a modification of the spring plate.

Proceeding next to the drawings wherein like reference symbols indicate the same parts throughout the various views a specific embodiment and modification of the present invention will be described in detail.

A housing 1 to be connected to a vehicle frame, which is not illustrated, contains a chamber 3 having a wall formed by a piston in the form of a flexible diaphragm 2. The chamber communicates through a pipe connection 4 with the air braking system. On the side away from chamber 3, a plate 5 contacts diaphragm 2, which plate is supported centrally on a spring plate 7 by means of a ball thrust member 6 recessed in the plate.

As seen in FIG. 2, spring plate 7 is provided with a central circular perforation 8 whose edge 9 is beveled toward the center of the plate on the side which faces the ball 6. Ball 6 rests on beveled edge 9. The spring plate 7 is also provided with recesses 10 in the form of slit-type perforations arranged in the form of a star, extending radially from perforation 8 toward the edge of the plate. Slit-type perforations 10 are provided with circular or arcuate enlargements 11 at their outer ends. The enlargements prevent the occurrence of notch stresses at the ends of the slits.

Plate 5 is supported for possible axial displacement in a housing ring 12, which is attached to housing 1 by means of bolts 13, of which only one is illustrated. Housing ring 12 is employed simultaneously for fastening diaphragm 2. A second chamber 14 within housing 1, which contains plate 5, ball 6 and spring plate 7, communicates with the atmosphere through a bore in which is positioned an air filter and is not illustrated. On the side of ball 6, spring plate 7 contacts an annular element 15 in the vicinity of its outer edge, which element is preferably made of spring steel and rests on housing ring 12 on the other side. A housing component 16, which surrounds spring plate 7 with a small play, retains annular element 15 in a position concentric to ball 6. On its other side, spring plate 7 rests on an annular element 17 in an intermediate annular range which, however, is situated near its outer edge. Preferably, annular element 17 is also made of spring steel. Annular element 17 which has a smaller ring-diameter than annular element 15, rests on a pressure plate 18 and is held in a position concentric to annular element 15 and to ball 6 by means of a spacer ring 19 having a smaller total height than annular element 17 and is guided for displacement in housing component 16. Pressure plate 18 is supported in parallel with spring plate 7 and with possibility of axial displacement in housing component 16. The inner edge of an annular diaphragm 20 is attached to pressure plate 18 on the side away from spring plate 7, which diaphragm is held at its outer edge on housing component 16. A radially inwardly projecting ring 21, recessed in housing component 16 between pressure plate 18 and diaphragm 20, forms an abutment for the movement of the pressure plate 18 in the downward direction, in reference to the drawings. With a central thrust portion 22, pressure plate 18 rests on an axle bearing of a vehicle wheel, which is not illustrated, possibly through the intermediary of a vehicle, spring device, which is likewise not illustrated.

In chamber 3, a piston 23 rests centrally on diaphragm 2, the piston ending with a valve seat 24 in front of a two-way valve packing 25. A spring 27, fastened between piston 23 and a housing insert 26 threaded into housing 1, presses piston 23 against diaphragm 2. Together with a valve seat 28 provided in housing insert 26, the valve packing 25 forms a valve 28, 25 monitoring the connection between a chamber 29 and chamber 3. A duct 31 leading to a pipe connection 30 ends in chamber 29. The valve packing 25 is held in a holder 32 which is guided in a sealed displaceable manner in an insert part 33 that defines chamber 29. Insert part 33 is held stationary and sealed in a bore 35 of housing insert 26, which bore is closed against the atmosphere by a ventilation cap 34. Two-way valve packing 25 and holder 32 are perforated by an axial bore 36, which possesses a smaller diameter than valve seat 24. Axial bore 36 ends in a chamber 37 of insert part 33 communicating with bore 35. Chamber 37 contains a spring 38 supported against insert part 33 and pressing holder 32 against valve seat 28.

A source of compressed air is to be connected to pipe connection 30 and the control input of a brake pressure regulator (which is not illustrated) is to be connected to pipe connection 4.

In the assembled or mounted condition, the balancing valve is subjected to the load of the vehicle to be carried by the vehicle wheel. The pressure of the source of pressure medium exists in chamber 29 and it is assumed that a control pressure corresponding to the load of the vehicle is present in chamber 3. Valves 24, 25 and 28, 25 are closed in this connection. The axle-bearing or the spring device of the vehicle presses annular element 17 (in this connection) against spring plate 7 by means of pressure plate 18, spring plate 7 transmitting the major portion of the contact force through spring ring 15 to housing ring 12 and there through housing 1 to the frame of the vehicle. A portion of the force exerted by annular element 17 is transmitted by spring plate 7 through ball 6 and plate 5 to diaphragm 2, which is loaded on the other side with exactly the same force by the control pressure appearing in chamber 3. Because of its load, spring plate 7 is bent into a slightly wave-shaped cross section.

If the load of the vehicle is then reduced, e.g., through unloading, diaphragm 2 is capable of pressing spring plate 7 by means of plate 5 and ball 6, while spreading apart both annular elements 15 and 17, as soon as a predetermined degree of unloading is reached. Under the force of spring 27, piston 23 follows the movement of diaphragm 2 and valve seat 24 is removed from valve packing 25. Compressed air then flows from chamber 3 through opened valve 24, 25, axial bore 36, chamber 37, bore 35 and ventilation chamber 34 into the atmosphere, until a pressure reduction corresponding to the reduction in the load of the vehicle takes place in chamber 3. Spring plate 7 is then capable under its own tension to press back diaphragm 2 together with piston 23, by means of ball 6 and plate 5, into the starting position, for the purpose of closing valve 24, 25.

If the vehicle load acting upon the balancing valve is increased by a value which exceeds a certain minimum amount, both annular elements 15, 17 are capable of pressing spring plate 7 through in the direction toward ball 6. Ball 6 is shifted in this connection together with the plate 5 in the direction toward chamber 3 and diaphragm 2 is pressed into chamber 3. Piston 23 is taken along by diaphragm 2, which piston through its valve seat 24 lifts valve packing 25 from valve seat 28. Compressed air then flows from the source of compressed air through chamber 29 and opened valve 28, 25 into chamber 3, until this chamber contains a pressure level which is sufficient for pressing at least the central portion of spring plate 7 back into the original relative position to housing 1, by means of diaphragm 2, plate 5 and ball 6. Piston 23 and holder 29 are pressed back into their starting positions by spring 27 and 38. Valve 28, 25 is again closed and the supply of compressed air to chamber 3 thus is interrupted. A pressure corresponding to the new load of the vehicle then prevails in chamber 3.

It is apparent that variations of the control pressure depend on the function of the valves 24, 25 and 28, 25. During load reduction, the valve seat 28 is moved away from the valve packing 25, to open the connection from chamber 3 to the atmosphere through the axial bore 36, chamber 37, bore 35 and ventilation chamber 34.

During an increase in the load of the vehicle, piston 23 through its valve seat 24 will lift valve packing 25 from valve packing 28 to open the connection to the pipe connection 30. From pipe connection 30, compressed air will enter from a source of compressed air through chamber 29 and open valve 28, 25 into chamber 3 so as to increase the control pressure in chamber 3 until the pressure level is sufficient to again close the valve 28, 25. After the 28, 25 28,25 is closed, a higher static pressure corresponding to the new load of the vehicle will prevail in chamber 3. This pressure acts on a certain pressure responsive control element, piston or the like, within the so-called brake pressure regulator which itself determines the level of the brake pressure.

Thus, the control pressure within the chamber 3 is static in nature and is constantly acting on a pressure responsive control element of a brake pressure regulator. Depressing of a brake pedal or other appropriate means therefore does not have any effect on the balancing valve, namely the operation of the valve means 24, 28, 25, 32 since the operating pressure for the brake cylinder is supplied from another pressure source. Thus, during the actuation of a brake pedal or other brake operator there is no fluid flow between conduits between the pipe connection 30 and pipe connection 4.

Accordingly, spring plate 7 acts as a cushioned reduction or step-down mechanism which transmits only a certain portion of the vehicle load to be absorbed by the balancing valve to diaphragm 2, which is to be held in balance by the control pressure. Due to the slot perforations 10 in the spring plate 7, the circumferential stress is thus removed and the plate is very flexible in comparison with a solid plate. A certain spring travel of the plate produces only a relatively small change in the spring force. Consequently, the orientation-deviations of spring plate 7, caused, for example, by assembly tolerances or by the wear of the spring plate or the annular elements at the points or surfaces of support and the curving changes of spring plate 7 connected therewith in the various switching positions of valves 24, 25 and 28, 25 exert only an insignificant effect on the control pressure fed into chamber 3 and acting back on spring plate 7 through diaphragm 2, plate 5 and ball 6.

FIG. 3 shows a cross section of a spring plate 40 modified with respect to the spring plate disclosed in FIGS. 1 and 2. Spring plate 40 is provided with recesses or removed material portions in the form of an annular zone 42 arranged concentrically to the center of the plate, extending outside a central circular area 41 comprising plate thickness $h$ (which is subjected to high stresses during a curving of the spring plate) and having a thickness which is smaller than plate thickness $h$. Zone 42 extends to the outer edge of spring plate 40. The transition from circular area 41 to annular zone 42 is sloped uniformly. During curving spring plate 40 is subjected to lesser stresses in the area of annular zone 42, so that a smaller plate thickness is sufficient without endangering the durability of the spring plate. Through the resulting optimal and uniform utilization of the plate material the entire spring plate 40 becomes softer and, accordingly, the spring plate becomes less sensitive to orientation in the balancing valve, as explained above. In the assembled state, spring plate 40 is supported in the balancing valve in the same manner as spring plate 7, ball 6 resting on circular area 41. The plate 40 has proved to be particularly effective in practice.

It is pointed out that in order to obtain a smaller spring rigidity even in relation to the spring plate 40 illustrated in FIG. 3, the spring plate may possess a different cross section varying through the diameter, which may be accomplished through the arrangement of suitable differently-shaped recesses. Similarly, spring plate 7 may be differently constructed in regard to the number or the shape of its perforations. This may be especially applicable or required in the case where (in modification of the exemplified embodiment illustrated) the balancing valve is designed in such a manner that spring plate 7 or 40 is supported centrally on housing 1 by means of suitable components and its edge is supported against plate 5. In such a case, annular element 17 must possess a substantially smaller diameter than illustrated in FIG. 1.

It will be understood that this invention is susceptible to modification in order to adapt it to different usages and conditions, and accordingly, it is desired to comprehend such modifications within this invention as may fall within the scope of the appended claims.

What is claimed is:

1. A balancing valve for a load-responsive brake pressure regulator for vehicle brakes using a pressure medium and comprising a housing, pressure regulator valve means within said housing for establishing a control pressure proportional to the load of the vehicle, a spring plate supported within said housing and acting upon valve means, moveable means (18) within said housing responsive to the load of the vehicle and acting against said spring plate on an intermediate annular portion thereof such that said spring plate is responsive to a proportion of the vehicle load and divides the force acting thereon by moveable means, a flexible diaphragm responsive to the forces of the control pressure of said valve means and acting against said spring plate to exert a restoring force opposite to the vehicle load, said spring plate having portions thereof removed to reduce the spring rigidity thereof.

2. A balancing valve as claimed in claim 1 wherein said spring plate removed portions comprise openings therein traversing said plate.

3. A balancing valve as claimed in claim 2 wherein said openings comprise a central opening and a plurality of radial slots extending therefrom.

4. A balancing valve as claimed in claim 3 wherein there are arcuately shaped enlargements at the outer ends of said slots.

5. A balancing valve as claimed in claim 3 wherein said spring plate is supported on its edge within said housing and being acted upon in its central portion by the restoring force exerted by said diaphragm.

6. A balancing valve as claimed in claim 5 wherein the edges of said central opening are beveled, and a thrust element supported and centered on said beveled edges to transmit the restoring force from said diaphragm to said spring plate.

7. A balancing valve as claimed in claim 1 wherein said spring plate removed portions comprise a reduced thickness outwardly of the center of said spring plate.

8. A balancing valve as claimed in claim 7 wherein said reduced thickness portion comprises an annular area concentric to the center of the plate.

* * * * *